(12) United States Patent
Magoley et al.

(10) Patent No.: US 7,559,574 B2
(45) Date of Patent: Jul. 14, 2009

(54) GAS BAG MODULE FOR A VEHICLE OCCUPANT RESTRAINT DEVICE

(75) Inventors: Marcus Magoley, Aschaffenburg (DE); Michael Schneider, Sulzbach (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 324 days.

(21) Appl. No.: 11/191,569

(22) Filed: Jul. 28, 2005

(65) Prior Publication Data

US 2006/0028008 A1 Feb. 9, 2006

(30) Foreign Application Priority Data

Aug. 5, 2004 (DE) .................. 20 2004 012 303 U

(51) Int. Cl.
*B60R 21/26* (2006.01)
*B60R 21/239* (2006.01)
*B60R 21/276* (2006.01)

(52) U.S. Cl. .................. 280/736; 280/739; 280/740; 280/741; 280/742

(58) Field of Classification Search .................. 280/736, 280/739, 740, 742
See application file for complete search history.

(56) References Cited

U.S. PATENT DOCUMENTS

| 3,618,980 | A |   | 11/1971 | Leising et al. |  |
|---|---|---|---|---|---|
| 4,178,017 | A |   | 12/1979 | Ishi et al. |  |
| 5,129,674 | A |   | 7/1992 | Levosinski |  |
| 5,509,686 | A | * | 4/1996 | Shepherd et al. | 280/738 |
| 5,860,672 | A | * | 1/1999 | Petersen | 280/728.2 |
| 6,039,347 | A | * | 3/2000 | Maynard | 280/736 |
| 6,082,765 | A | * | 7/2000 | Bowers et al. | 280/742 |
| 6,183,007 | B1 |   | 2/2001 | Steffens, Jr. et al. |  |
| 6,471,239 | B1 | * | 10/2002 | Nishijima et al. | 280/729 |
| 6,592,141 | B1 | * | 7/2003 | Dancasius et al. | 280/728.2 |
| 6,776,434 | B2 | * | 8/2004 | Ford et al. | 280/729 |
| 7,083,191 | B2 | * | 8/2006 | Fischer |  |
| 2001/0045734 | A1 | * | 11/2001 | Damman et al. | 280/736 |
| 2003/0025309 | A1 | * | 2/2003 | Schenck et al. | 280/735 |
| 2003/0107207 | A1 | * | 6/2003 | Elqadah et al. | 280/735 |
| 2003/0173761 | A1 | * | 9/2003 | Rink et al. | 280/736 |
| 2003/0189326 | A1 | * | 10/2003 | Short et al. | 280/736 |
| 2003/0197357 | A1 | * | 10/2003 | Heigl et al. | 280/736 |
| 2004/0051286 | A1 |   | 3/2004 | Fischer et al. |  |
| 2004/0108691 | A1 |   | 6/2004 | Dahmen |  |
| 2005/0029784 | A1 |   | 2/2005 | Siegel et al. |  |
| 2005/0073139 | A1 | * | 4/2005 | Fischer et al. | 280/740 |
| 2005/0212274 | A1 | * | 9/2005 | Massanetz et al. | 280/740 |
| 2006/0226642 | A1 | * | 10/2006 | Britz | 280/736 |

(Continued)

FOREIGN PATENT DOCUMENTS

DE 19806773 9/1998

(Continued)

*Primary Examiner*—Christopher P Ellis
*Assistant Examiner*—Jacob Meyer
(74) *Attorney, Agent, or Firm*—Tarolli, Sundheim, Covell & Tummino LLP

(57) ABSTRACT

A gas bag module (10) for a vehicle occupant restraint device includes a gas generator (14) for filling a gas bag (16), and a gas conduit device arranged inside the module. The gas conduit device forces a predetermined, uniform flow direction at least on a portion of the gas emerging from the gas generator (14).

13 Claims, 3 Drawing Sheets

U.S. PATENT DOCUMENTS

2006/0255578 A1* 11/2006 Choi et al. .................. 280/740

FOREIGN PATENT DOCUMENTS

| | | |
|---|---|---|
| DE | 19731220 | 1/1999 |
| DE | 29903233 | 8/1999 |
| DE | 29917943 | 3/2001 |
| DE | 20200365 | 8/2002 |
| DE | 10142598 | 4/2003 |
| DE | 20310575 | 11/2003 |
| EP | 1288083 | 3/2003 |
| WO | 03/047917 | 6/2003 |

* cited by examiner

GAS BAG MODULE FOR A VEHICLE OCCUPANT RESTRAINT DEVICE

TECHNICAL FIELD

The invention relates to a gas bag module for a vehicle occupant restraint device.

BACKGROUND OF THE INVENTION

A gas bag is to be filled as quickly as possible with the gas generated by the gas generator. Under particular circumstances, however, it is desirable that the gas bag is not filled with the entire volume of gas which is made available. For such cases, outflow openings can be provided in the gas bag module. By freeing the outflow openings, the pressure in the gas bag can be limited. Such a gas bag module is known from published U.S. patent application US 2004/0051286 A1, for example.

In addition, it is known from published German patent application DE 198 06 773 A1 not to convey the gas volume provided by the gas generator directly into the gas bag, but rather firstly to an antechamber with a gas flow control means with which the intensity and/or the direction of the gas volume flow can be influenced.

U.S. Pat. No. 6,183,007 shows a gas generator with a diffusor which has several outflow openings giving the emerging gas different flow directions in order to ensure a uniform filling of the gas bag.

It is an object of the invention to achieve an advantageous flow of the gas emerging-out from the gas generator.

BRIEF SUMMARY OF THE INVENTION

According to the invention, the gas bag module for a vehicle occupant restraint device comprises a gas generator for filling a gas bag, and a gas conduit device arranged inside the module which forces a predetermined, uniform flow direction on at least a portion of the gas emerging out from the gas generator. The invention is based on the knowledge that a laminar flow of the gas has a positive effect on the heat resistance of the adjoining components of the gas bag module compared with a turbulent flow. The gas conduit device according to the invention provides the preconditions for such a form of flow. The gas conduit device makes provision in addition that the gas also shows a desired behaviour as regards flow direction and flow type in the further flow path.

Such a flow behaviour is particularly advantageous when a portion of the generated gas is to be diverted to delimit the gas bag pressure. For such a case of application, a gas bag module according to the invention is proposed having an outflow opening which is able to be freed to enable gas to flow off out from the gas bag module, the gas conduit device being designed so that it directs at least a portion of the gas which has emerged from the gas generator to the outflow opening. Therefore, with a freeing of the outflow opening, the gas can be conveyed out from the gas bag module in a controlled manner via the path course provided by the gas conduit device.

DETAILED DESCRIPTION OF THE PREFFERED EMBODIMENTS

Figure 1:
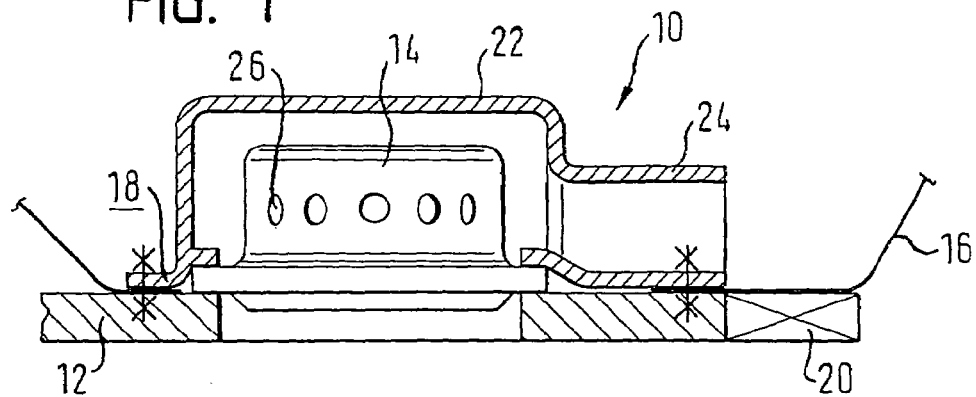
FIG. 1 shows diagrammatically a lateral sectional view of a gas bag module according to a first embodiment of the invention.

In FIG. 1 a gas bag module 10 with a gas bag 16 and a gas generator 14 fastened on a generator carrier 12 is illustrated diagrammatically. The gas bag 16 is clamped between a gas bag holding plate 18 and the generator carrier 12. In the generator carrier 12 a discharge opening 20 is provided, which can be freed as required, in order to make possible an outflow of gas. The gas generator 14 is surrounded by a cage 22 which in the illustrated example embodiment is constructed in one piece with the gas bag holding plate 18. The cage 22 has a gas conduit device in the form of a channel 24 which leads to the discharge opening 20.

A predetermined, uniform flow direction is forced by the channel 24 onto the gas generated by the gas generator 14, which emerges radially out from the outflow openings 26. The channel 24 deliberately directs the gas to the discharge opening 20 and provides for a substantially laminar flow of the gas. As long as the discharge opening 20 is freed, a portion of the gas generated by the gas generator 14 can emerge out from the module 10. This portion of the gas does not contribute to the filling of the gas bag 16. As long as the discharge opening 20 is closed, the gas flows substantially in a laminar manner into the gas bag 16.

Figure 2:
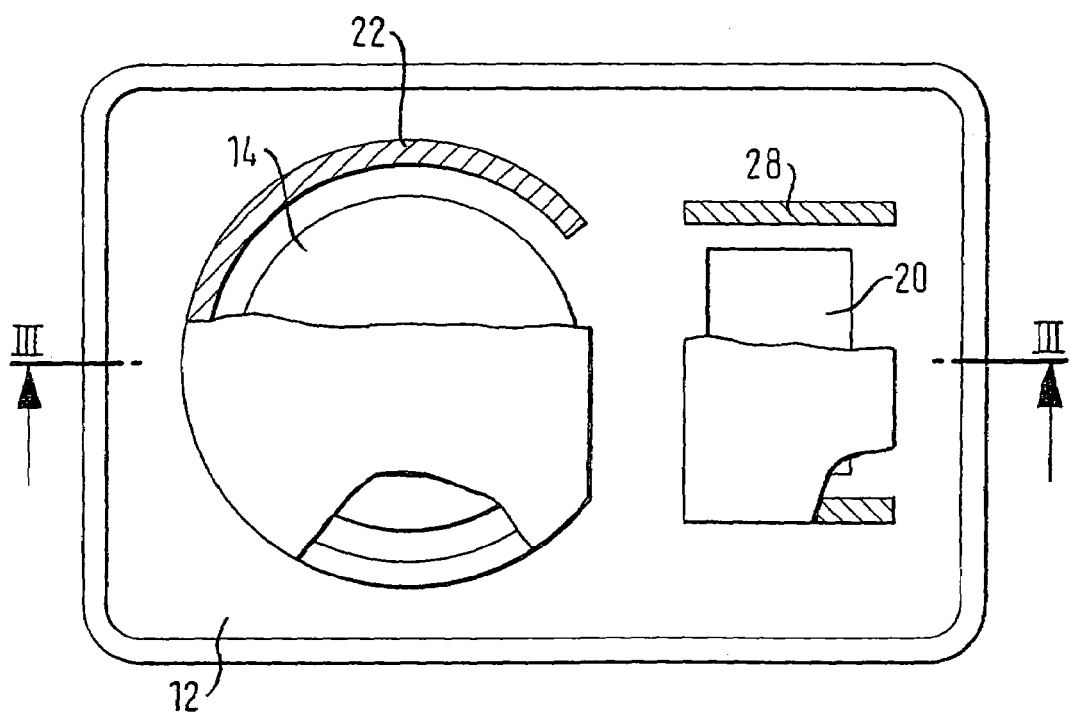
FIG. 2 shows diagrammatically a top view partially in section onto a gas bag module according to a second embodiment of the invention.
Figure 3:
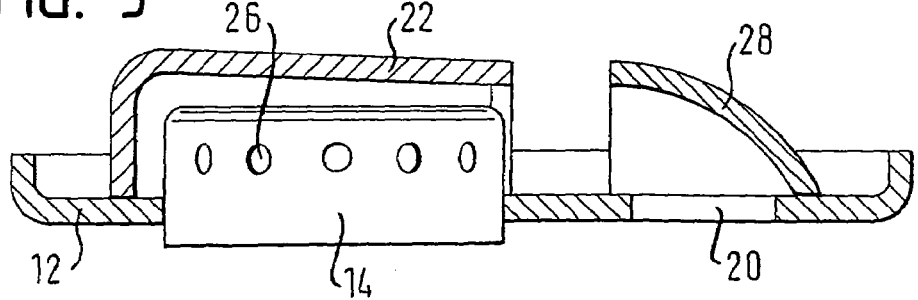
FIG. 3 shows diagrammatically a lateral sectional view along the line III-III in FIG. 2.

The gas conduit device of the embodiment illustrated in FIGS. 2 and 3 is constructed in two parts. The cage 22 surrounding the gas generator 14 is open to one side, which faces the discharge opening 20. Over the discharge opening 20 a separate baffle plate 28 is arranged which directs a portion of the gas emerging out from the opening of the cage 22 specifically onto the discharge opening 20.

Figure 4:
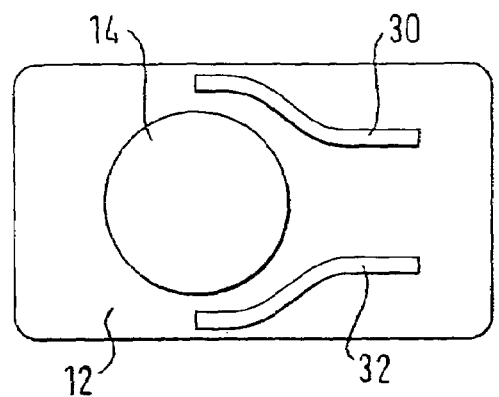
FIG. 4 shows diagrammatically a top view in section onto a gas bag module according to a third embodiment of the invention.

FIG. 4 shows an embodiment in which two specially formed baffle plates 30 and 32 are provided, in order to give the gas which has emerged from the gas generator 14 the desired direction of flow and to make possible as laminar a flow as possible.

Figure 5:
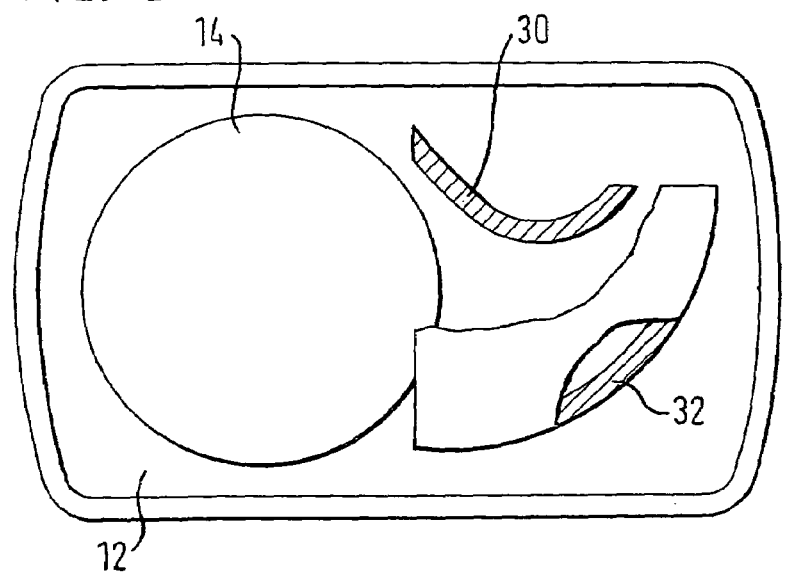
FIG. 5 shows diagrammatically a top view partially in section onto a gas bag module according to a fourth embodiment of the invention.

A similar embodiment is shown in FIG. 5, in which the gas is given a different flow direction through the gas conduit device.

Figure 6:
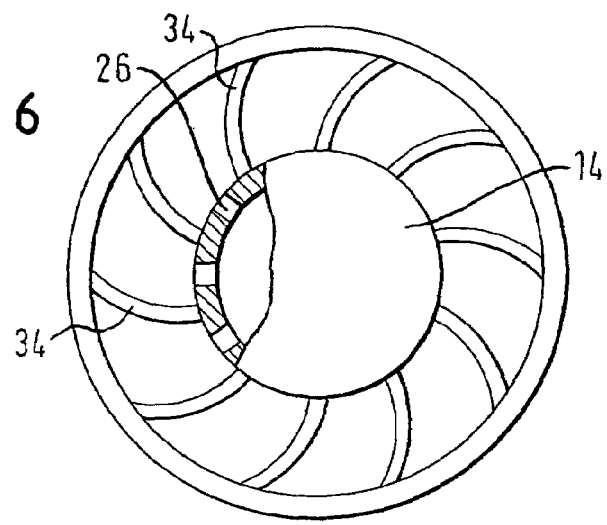
FIG. 6 shows diagrammatically a top view partially in section onto a part of a gas bag module according to a fifth embodiment of the invention.

In the embodiment shown in FIG. 6, several baffle plates 34 are arranged respectively between two outflow openings 26 of the gas generator 14. The baffle plates 34 force the gas, emerging radially out from the outlet openings 26, into a uniform flow direction (clockwise) with as largely as possible a laminar flow path.

Figure 7:
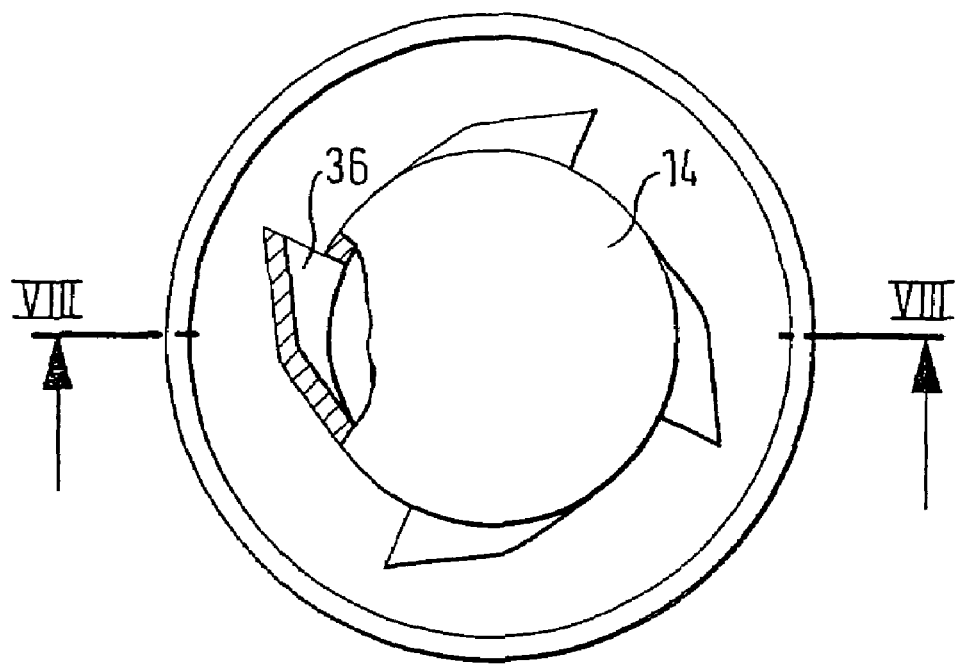
FIG. 7 shows diagrammatically a top view partially in section onto a part of a gas bag module according to a sixth embodiment of the invention.
Figure 8:
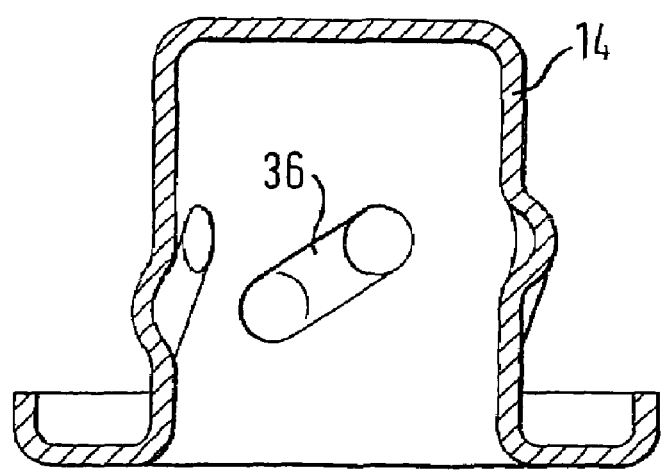
FIG. 8 shows diagrammatically a lateral sectional view along the line VIII-VIII in FIG. 7.

The embodiment shown in FIGS. 7 and 8 is similar to the embodiment of FIG. 6. In order to achieve the desired gas flow, however, no separate baffle plates are provided here. Rather, specially constructed outlet channels 36 are provided on the gas generator 14 itself, which give the emerging gas a predetermined, uniform direction. The outflow channels 36 can be part of a diffusor of the gas generator 14.

The arrangement, number and size of the outflow openings of the gas generator and/or of the cage can also contribute to the desired flow behaviour.

Instead of metal baffle plates, corresponding components made of plastic can also be used.

Of course, the measures shown in the individual embodiments can also be combined in a suitable manner.

The invention claimed is:

1. A gas bag module for a vehicle occupant restraint device, the gas bag module comprising a gas generator for filling a gas bag, a releasable discharge opening, which, in a released state, allows gas to flow out from the gas bag module, and a gas conduit device arranged inside the module, said gas conduit device being configured to force a predetermined, uniform flow direction at least on a portion of the gas emerging from the gas generator, the gas conduit device being formed at least partially by a gas bag holding plate of the gas bag module, the gas conduit device being configured to direct the portion of the gas to the releasable discharge opening before the portion of the gas can contribute to the filing of the gas bag.

2. The gas bag module according to claim 1, wherein the gas conduit device is designed for a laminar flow of the gas.

3. The gas bag module according to claim 1, wherein the gas conduit device comprises at least one baffle plate.

4. The gas bag module according to claim 1, wherein the gas conduit device is formed at least partially by outlet channels of the gas generator.

5. A gas bag module according to claim 1 including a generator carrier, wherein the gas bag is clamped between said gas bag holding plate and said generator carrier.

6. A gas bag module according to claim 5 wherein said gas generator is fastened on said generator carrier.

7. The gas bag module according to claim 1, further comprising a cage, the gas bag holding plate and the cage being constructed in one piece.

8. The gas bag module according to claim 7, wherein said gas generator includes at least one outflow opening for allowing gas generated by said gas generator to flow out of said gas generator and into said cage.

9. The gas bag module according to claim 5, wherein said releasable discharge opening is in said generator carrier.

10. The gas bag module according to claim 1, wherein said releasable discharge opening is near said gas conduit device.

11. The gas bag module according to claim 1, wherein said gas conduit device is separate from said gas generator, said gas generator including at least one outflow opening for allowing gas generated by said gas generator to flow into said gas conduit device.

12. A gas bag module for a vehicle occupant restraint device comprising:
 a gas generator having an outflow opening that directs gas out of the gas generator to fill a gas bag;
 a discharge opening that directs gas out of the gas bag module away from the gas bag when in a released state; and
 a gas bag holding plate connecting the gas bag to the gas bag module, the gas bag holding plate at least partially defining a gas conduit device inside the gas bag module, the gas conduit device configured to force a predetermined, uniform flow direction on a portion of the gas produced by the gas generator, the gas conduit device being located between the gas generator and the discharge opening and preventing the portion of the gas from filling the gas bag.

13. The gas bag module according to claim 12, wherein the gas bag holding plate and a cage surrounding the gas generator are one-piece.

\* \* \* \* \*